United States Patent
Li et al.

(10) Patent No.: US 10,664,289 B2
(45) Date of Patent: May 26, 2020

(54) LOADING SUB-APPLICATIONS FOR A TERMINAL APPLICATION

(71) Applicant: Alibaba Group Holding Limited, George Town (KY)

(72) Inventors: Lizhong Li, Hangzhou (CN); Guanghui Zhou, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 25 days.

(21) Appl. No.: 15/926,711

(22) Filed: Mar. 20, 2018

(65) Prior Publication Data

US 2018/0217853 A1 Aug. 2, 2018

Related U.S. Application Data

(63) Continuation of application No. PCT/CN2016/098814, filed on Sep. 13, 2016.

(30) Foreign Application Priority Data

Sep. 21, 2015 (CN) .......................... 2015 1 0603127

(51) Int. Cl.
*G06F 9/44* (2018.01)
*G06F 9/445* (2018.01)
*G06F 9/48* (2006.01)
*G06F 8/61* (2018.01)

(52) U.S. Cl.
CPC ............ *G06F 9/44521* (2013.01); *G06F 8/61* (2013.01); *G06F 9/44578* (2013.01); *G06F 9/48* (2013.01)

(58) Field of Classification Search
None
See application file for complete search history.

(56) References Cited

U.S. PATENT DOCUMENTS

| 2001/0051916 | A1  | 12/2001 | Shiomi et al. |
| 2009/0037930 | A1* | 2/2009  | Shiono ..................... G06F 8/61 |
|              |     |         | 719/313 |
| 2012/0324481 | A1  | 12/2012 | Xia et al. |

(Continued)

FOREIGN PATENT DOCUMENTS

| CN | 1223092   | 10/2005 |
| CN | 102841753 | 12/2012 |

(Continued)

OTHER PUBLICATIONS

International Search Report of the International Searching Authority issued in International Application No. PCT/CN2016/093814 dated Dec. 21, 2016; 8 pages.

(Continued)

*Primary Examiner* — Shih-Wei Kraft
(74) *Attorney, Agent, or Firm* — Fish & Richardson P.C.

(57) ABSTRACT

A first instruction for triggering a starting action on a main application (app) installed on a terminal and including at least one sub-app is received. In response to the first instruction, application loading information corresponding to the main app and including identifier information for a to-be-loaded sub-app is acquired. Based on the identifier information for the to-be-loaded sub-app, the to-be-loaded sub-app is determined and loaded during a process of starting the main app.

6 Claims, 8 Drawing Sheets

(56) References Cited

U.S. PATENT DOCUMENTS

| | | | | |
|---|---|---|---|---|
| 2013/0304608 | A1* | 11/2013 | Mehta | G06Q 30/0282 705/26.7 |
| 2014/0149920 | A1 | 5/2014 | Wang et al. | |
| 2015/0378593 | A1 | 12/2015 | Zhang et al. | |
| 2016/0085514 | A1 | 3/2016 | Savliwala et al. | |

FOREIGN PATENT DOCUMENTS

| | | |
|---|---|---|
| CN | 102999268 | 3/2013 |
| CN | 103078670 | 5/2013 |
| CN | 103309684 | 9/2013 |
| CN | 103853606 | 6/2014 |
| CN | 104035804 | 9/2014 |
| CN | 104199735 | 12/2014 |
| JP | H06348500 | 12/1994 |
| JP | 2002049500 | 2/2002 |
| JP | 2014225724 | 12/2014 |
| KR | 100538778 | 12/2005 |
| KR | 1020130048904 | 5/2013 |
| KR | 1020140070330 | 6/2014 |
| TW | I494786 | 8/2015 |
| TW | 201617921 | 5/2016 |
| TW | I533212 | 5/2016 |

OTHER PUBLICATIONS

Extended European Search Report issued in EP Application No. 16848028.3 dated Sep. 24, 2018; 10 pages.

Ye Xu et al: "Preference, Context and Communities: A Multi-faceted Approach to Predicting Smartphone App Usage Patterns", Proceedinfs of The 17th Annual International Symposium in International Symposium on Wearable Computers, ISWC'13, Jan. 1, 2013 (Jan. 1, 2013), p. 69, XP055164842, New York, New York, USA; 8 pages.

Written Opinion in Singaporean Application No. 11201802048X, dated Dec. 11, 2018, 6 pages.

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

Kim et al., "Usage History-Based Architectural Scheduling," Computer Software and Applications Conference, 33rd Annual IEEE International, Jul. 2009, pp. 443-451.

* cited by examiner

LOADING SUB-APPLICATIONS FOR A TERMINAL APPLICATION

This application is a continuation of PCT Application No. PCT/CN2016/098814, filed on Sep. 13, 2016, which claims priority to Chinese Patent Application No. 201510603127.7, filed on Sep. 21, 2015, and each application is incorporated by reference in its entirety.

BACKGROUND

The present application relates to the field of software technologies, and in particular, to techniques for loading a terminal application (app). In conventional systems, multiple sub-apps are generally nested in a certain main app that is installed on a terminal. As such, multiple sub-apps can be selectively loaded in an interface of a certain main app. For example, when a user triggers a starting action on a certain main app nested with a plurality of sub-apps, all sub-apps nested in the main app are generally loaded during the process of starting the main app. The loading process is a process in which application programs on a hard disk of a terminal are loaded into a memory of the terminal. For example, the assumption can be that a set of sub-apps included in a certain main app is: {sub-app 1, sub-app 2, . . . , and sub-app n}. Then, the terminal can load sub-app 1, sub-app 2, . . . , and sub-app n in sequence when a user triggers a starting action on the main app. This loading process causes a problem in that all sub-apps included in a certain main app need to be loaded in sequence during the process of starting the main app. As such, the loading process can be relatively time-consuming, and the process of opening the main app can be slowed down.

SUMMARY

The present disclosure describes techniques for loading sub-applications of a main application (app).

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, opening a main app can be faster in comparison to the speed of loading all sub-apps included in a main app in conventional systems. Second, loading of sub-apps can be more efficient.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes techniques for loading sub-applications of a main application (app), and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

The present disclosure describes techniques for loading a terminal application (app) in a way that can solve performance problems in conventional systems. For example, after a first instruction for triggering a starting action on a main app is received, application loading information that corresponds to the main app can be acquired, a to-be-loaded sub-app can be determined by analyzing the application loading information, and then the determined to-be-loaded sub-app can be loaded during the process of starting the main app. During the process, because the to-be-loaded sub-app is determined using the acquired application loading information, the time consumed in the application loading process can be shortened. Moreover, opening the main app can be faster in comparison to the speed of loading all sub-apps included in a main app in conventional systems.

Figure 1:
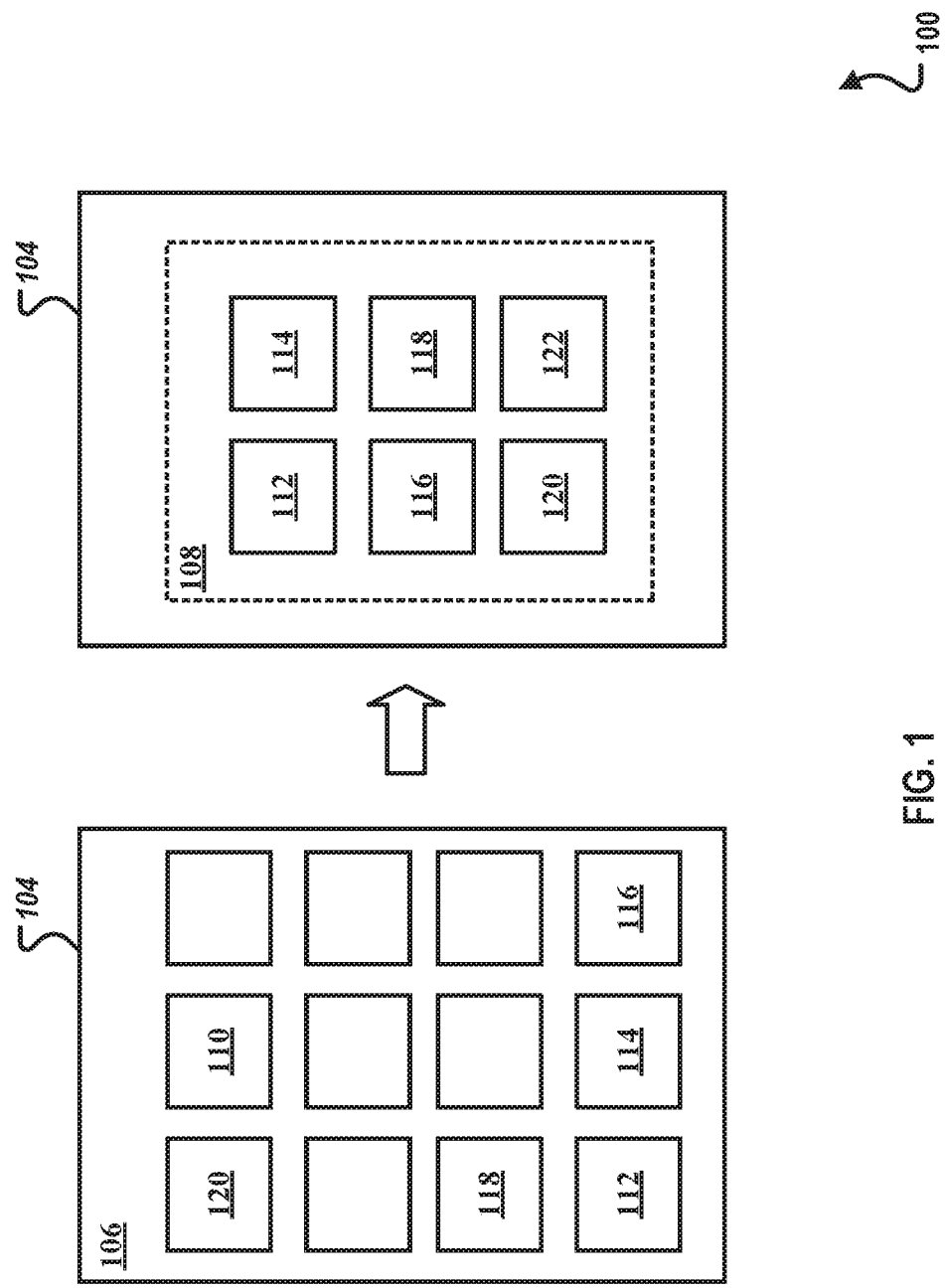
FIG. 1 is a block diagram of an example of an interface of a main application (app) on a terminal and sub-apps included in the main app, according to an implementation of the present disclosure.

FIG. 1 is a block diagram of an example of an interface 100 of a main application (app) on a terminal and sub-apps included in the main app, according to an implementation of the present disclosure. A main interface 106 of a terminal 104 includes icons of apps that are installed on the terminal 104. The icons of the apps can be icons of a main app that include multiple sub-apps, and can also be icons of independent apps that do not include sub-apps. When a user that uses the terminal 104 triggers a starting action on a main app (for example, by selecting or clicking on an icon 110 of the main app), the terminal can switch from the main interface 106 to an interface 108 of the main app. The interface 108 of the main app (for example, the app corresponding to the icon 110) can include icons 112, 114, 116, 118, 120, and 122 of multiple sub-apps that can run in the main app. The user can load the sub-apps on the interface 108 of the main app by tapping the icons of the sub-apps.

Figure 2:
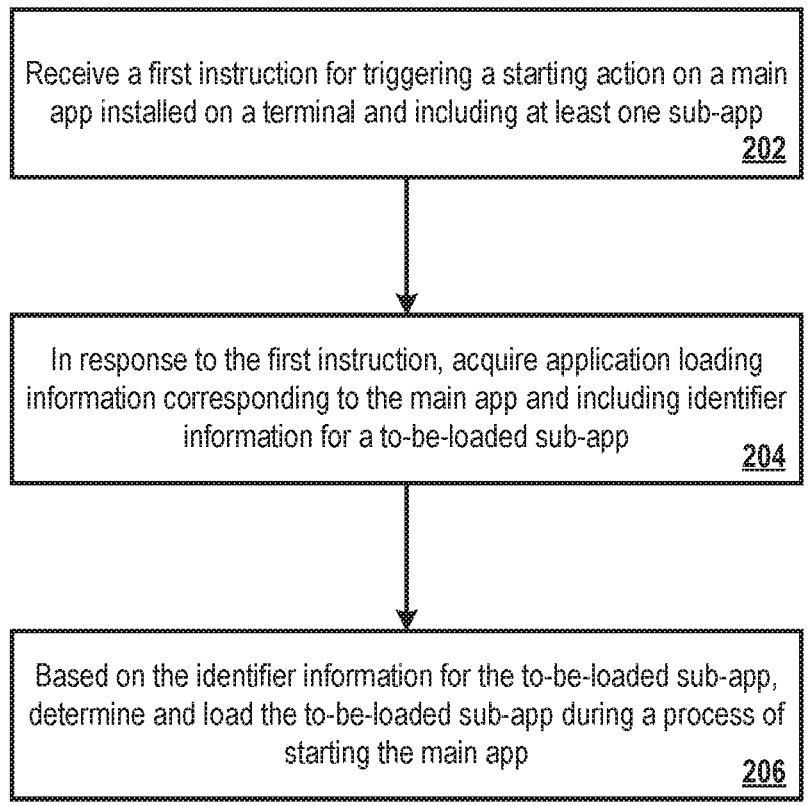
FIG. 2 is a flow chart of an example of a method for loading a main app on a terminal and sub-apps included in the main app, according to an implementation of the present disclosure.

FIG. 2 is a flow chart of an example of a method 200 for loading a main app on a terminal and sub-apps included in the main app, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a first instruction is received for triggering a starting action on a main app installed on a terminal and including at least one sub-app. For example, a user can touch a designated area of a touch screen of a terminal with a finger. The designated area can be the location of the icon 110 of the main app. The terminal can receive a first instruction of the user for triggering a starting action on the main app by sensing the user's action of tapping the icon 110 of the main app. From 202, method 200 proceeds to 204.

At 204, in response to the first instruction, application loading information is acquired that corresponds to the main app and includes identifier information for a to-be-loaded sub-app. For example, the application loading information can be generated based on usage frequency information of sub-apps in a predefined time period. In some implementations, after the user triggers a starting action on a certain main app, a sub-app to be loaded during the process of starting the main app can be determined. The terminal can read the application loading information from a certain directory of the terminal after receiving the first instruction. The application loading information can indicate which sub-apps should be loaded during the process of starting the main app.

The application loading information can be generated based on usage frequency information of sub-apps in a predefined time period. The usage frequency information can indicate how often the sub-apps are used. For example, a set of sub-apps included in an interface 108 of a certain main app (for example, an app corresponding to the icon 110) can be: {a first sub-app, a second sub-app, a third sub-app, a fourth sub-app, a fifth sub-app, and a sixth sub-app}. The first sub-app can correspond to the icon 112, the second sub-app can correspond to the icon 114, the third sub-app can correspond to the icon 116, the fourth sub-app can correspond to the icon 118, the fifth sub-app can correspond to the icon 120, and the sixth sub-app can correspond to the icon 122. A predefined time period for conducting statistics on usage frequency information can be, for example, a time length of one week.

In some implementations, the following usage frequency information can be obtained by statistical analysis. The usage frequency information of the first sub-app in the past one week can be determined to be 3.2 times per day. The usage frequency information of the second sub-app in the past one week can be determined to be 8.5 times per day. The usage frequency information of the third sub-app in the past one week can be determined to be 4.3 times per day. The usage frequency information of the fourth sub-app in the past one week can be determined to be 5.5 times per day. The usage frequency information of the fifth sub-app in the past one week can be determined to be 1.2 times per day. The usage frequency information of the sixth sub-app in the past one week can be determined to be 0.5 times per day.

The usage frequency information of the sub-apps in a predefined time period (for example, one week) obtained based on the above statistical analysis can be sorted in a descending order. One or more sub-apps used relatively frequently can be determined as one or more to-be-loaded sub-apps during the process of starting the main app. The to-be-loaded sub-app or sub-apps can be pre-determined on the terminal based on usage frequency information acquired periodically. The application loading information that can be read by the terminal can be generated correspondingly.

In some implementations, the application loading information can include identifier information about to-be-loaded sub-apps. For example, if it is determined that the to-be-loaded sub-apps are the second sub-app (for example, the app corresponding to the icon 114) and the fourth sub-app (for example, the app corresponding to the icon 118, then the application loading information can include identifier information about the second sub-app and identifier information about the fourth sub-app. The identifier information can include an app name, an app number, or some other identifying information. In some implementations, before the application loading information is acquired, the application loading information can be generated by performing the following steps.

First, request information for acquiring usage frequency information can be sent to a server side. For example, for sub-apps installed on a terminal (or client side), statistics on usage frequency information indicating how often users use the sub-apps in a predefined time period can be conducted on server sides of the sub-apps. A server side can record the number of times a user logs into an app account or record the number of times the user accesses data on the server side. The terminal can send, to the server side, request information for requesting acquisition of usage frequency information of sub-apps included in a certain main app. The request information can include a user identifier (ID), a predefined time period, identifier information about the main app, and other information. In some implementations, the terminal can send the request information to a server side of the main app. Then, the server side of the main app can collect the usage frequency information from server sides of the sub-apps.

Second, in response to the request information, usage frequency information of sub-apps included in the main app in a predefined time period can be received from the server side. For example, the server side can provide, to the terminal, the usage frequency information that is obtained from statistics and that indicates how often the user has used the sub-apps in a past predefined time period.

Third, the received usage frequency information can be sorted in a descending order, and a sub-app whose usage frequency information can be sorted in the first sort position can be determined as the to-be-loaded sub-app. For example, sorting can be performed based on the usage frequency information, and the sort position of the sub-app can be the first position. This can indicate that the sub-app is used relatively frequently and can signal that the sub-app is to be taken as the to-be-loaded sub-app. In some implementations, the number of to-be-loaded sub-apps needing to be determined can be selected or determined by the user. In some implementations, the number of to-be-loaded sub-apps can also be determined by the terminal based on the total number of sub-apps included in the main app. For example, it can be determined that the number of the to-be-loaded sub-apps is half of the total number.

Fourth, application loading information that includes identifier information about the to-be-loaded sub-app can be generated and stored in a designated directory of the terminal. For example, the application loading information can be written into a certain readable file, and the file can be stored in a designated directory of the main app.

In some implementations, before the application loading information is acquired, the application loading information can be generated by performing the following steps. First, usage frequency information of sub-apps included in the main app in a predefined time period can be acquired from an installation directory of the main app of the terminal. Second, the received usage frequency information can be sorted in a descending order, and a sub-app whose usage frequency information is in the first sort position can be determined as the to-be-loaded sub-app. Third, application loading information that includes identifier information about the to-be-loaded sub-app can be generated and stored in a designated directory of the terminal. In some implementations, the terminal can monitor data of the user's behavior of using the main app and sub-apps included in the main app. The terminal can the generate statistics to obtain usage frequency information indicating how often the user uses the sub-apps, and the terminal can store the usage frequency information in a local storage space of the terminal. The terminal can periodically read the usage frequency information from the local storage space and generate a readable file that includes application loading information. From 204, method 200 proceeds to 206.

At 206, the to-be-loaded sub-app is determined and loaded during the process of starting the main app based on the identifier information for the to-be-loaded sub-app included in the acquired application loading information. For example, based on the acquired file pre-written into the application loading information, the terminal can obtain to-be-loaded sub-apps by analysis and load the determined sub-apps during the process of starting the main app. For example, if the determined to-be-loaded sub-apps are the second app and the fourth app, only these two apps need to be loaded during the process of starting the main app. This can eliminate the disadvantage in conventional systems in which the loading time is long and the speed of opening the main app is slow, since all sub-apps included in a certain main app need to be loaded at a time during the process of starting the main app. After 206, method 200 stops.

Figure 3:
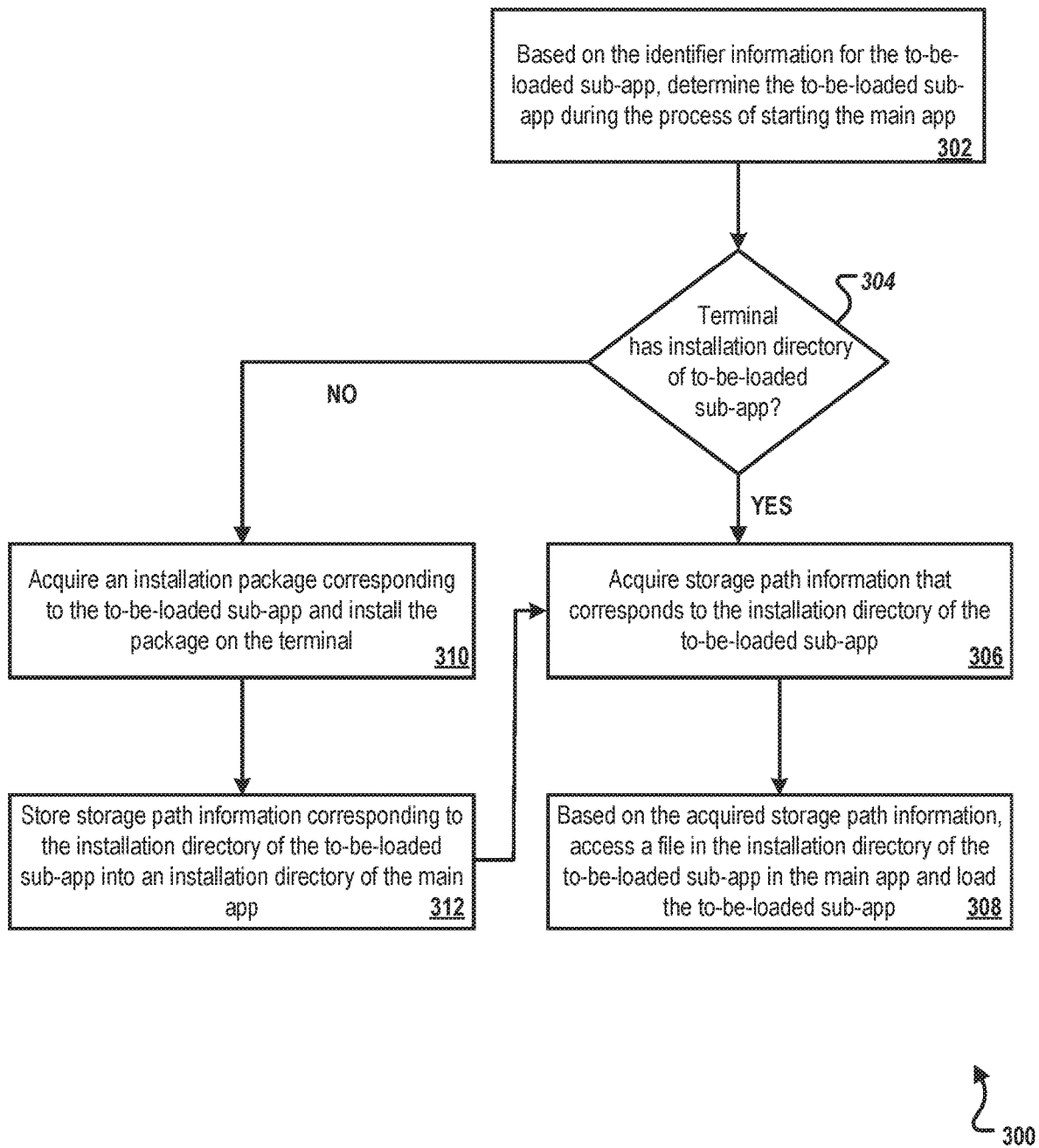
FIG. 3 is a flowchart of an example of a method for loading a terminal app, according to an implementation of the present disclosure.

FIG. 3 is a flowchart of an example of a method 300 for loading a terminal app, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, the to-be-loaded sub-app is determined during the process of starting the main app. For example, the to-be-loaded sub-app can be determined based on the identifier information for the to-be-loaded sub-app included in the acquired application loading information. From 302, method 300 proceeds to 304.

At 304, a determination is made whether the terminal has an installation directory of the to-be-loaded sub-app. For example, the sub-apps included in the main app can be packaged into an independent app and installed on the terminal. Referring to FIG. 1, in addition to the icon 110 of the main app, the main interface 106 of the terminal also includes icons 112, 114, 116, 118, 120, and 122 of the sub-apps included in the main app. The sub-apps can be independently installed on the terminal 104. Upon completion of installation, the terminal 104 can have respective installation directories corresponding to the sub-apps, and installation files of the sub-apps can be stored in the installation directories. Finally, the terminal can scan a storage space to determine whether the storage space of the terminal has an installation directory that corresponds to the to-be-loaded sub-app. From 304, when it is determined that the terminal has an installation directory of the to-be-loaded sub-app, method 300 proceeds to 306. Otherwise, method 300 proceeds to 310.

At 306, if the storage space of the terminal has an installation directory that corresponds to the to-be-loaded sub-app, storage path information that corresponds to the installation directory of the to-be-loaded sub-app is acquired. For example, after a certain sub-app is installed successfully, a file can be stored in a certain designated path under an installation directory of a main app that corresponds to the sub-app. The file can be written into the storage path information that corresponds to the installation directory of the to-be-loaded sub-app. As such, after the starting action on the main app is triggered, the main app can read the file written into the storage path information that corresponds to the installation directory of the to-be-loaded sub-app to acquire storage path information that corresponds to an installation directory of a sub-app to be loaded currently. For example, storage path information that corresponds to an installation directory of the first sub-app (that corresponds to the icon 112) can be "Program Files/app1/a." An installation directory of the main app can be "Program Files/app." Then the storage path information can be written into a certain file, and the file can be stored in the installation directory of the main app (for example, "Program Files/app"). From 306, method 300 proceeds to 308.

At 308, based on the acquired storage path information, a file in the installation directory of the to-be-loaded sub-app is accessed in the main app and the to-be-loaded sub-app is loaded. For example, after the storage path information of the to-be-loaded sub-app is acquired, the main app can access resources of the to-be-loaded sub-app through the storage path. That is to say, the terminal can reuse an installation file in an installation directory of a certain sub-app in the framework of a current main app to implement loading of the to-be-loaded sub-app in the main app. When the main app is not started, the user can also run sub-apps independently by tapping icons of the sub-apps in the main interface 106. After 308, method 300 stops.

At 310, if the terminal does not have an installation directory of the to-be-loaded sub-app, an installation package that corresponds to the to-be-loaded sub-app can be acquired and installed on the terminal. For example, it can be determined that the to-be-loaded sub-app includes the sixth sub-app (the app corresponding to the icon 122). If the icon of the sixth sub-app does not exist in the main interface 106 of the terminal, this can indicate that the sixth sub-app is not installed on the terminal currently (that is, an installation directory of the to-be-loaded sub-app does not exist). In this case, the terminal can query the user, asking whether the sixth sub-app needs to be downloaded and installed. If the user agrees to download and install the sixth sub-app, then the terminal can acquire and download an installation package of the sixth sub-app from the Internet and install the package on the terminal. From 310, method 300 proceeds to 312.

At 312, storage path information that corresponds to the installation directory of the to-be-loaded sub-app is stored in an installation directory of the main app. As an example, upon completion of the installation of a certain sub-app, storage path information that corresponds to an installation directory of the sub-app can be written into a certain file, and the file can be stored in an installation directory of the main app. As such, during the process of subsequently triggering the starting action on the main app by the user, the storage path information that corresponds to the sub-app can be found, and resources in the installation directory of the sub-app can be accessed based on the storage path information. After 312, method 300 continues to 306.

A second instruction for triggering a starting action on a first sub-app that is included in the main app can be received. In response to the second instruction, a determination can be made as to whether the first sub-app is a sub-app loaded during the process of starting the main app. If the first sub-app is not a sub-app loaded during the process of starting the main app, a determination can be made as to whether the terminal has an installation directory of the first sub-app. If the terminal does not have an installation directory that corresponds to the first sub-app, an installation package that corresponds to the first sub-app can be acquired and installed on the terminal. Storage path information that corresponds to the installation directory of the to-be-loaded first sub-app can be stored in an installation directory of the main app.

If the terminal has an installation directory that corresponds to the first sub-app, storage path information that corresponds to the installation directory of the to-be-loaded first sub-app can be acquired. Based on the acquired storage path information, a file in the installation directory of the to-be-loaded first sub-app can be accessed in the main app, and the to-be-loaded first sub-app can be loaded.

In an example scenario, the following can occur. After a user opens an interface of a certain main app, a starting action on a certain sub-app can be triggered by tapping an icon of the certain sub-app in the interface of the main app. Afterwards, the terminal can scan a storage space of the terminal to determine whether an installation directory of the to-be-started sub-app has existed in the storage space (determining whether the sub-app has been installed). If the installation directory does not exist, then an installation package of the sub-app can be downloaded using the Internet, and the sub-app can be installed as an independent app. The storage path information of the sub-app can be written into a particular file. The particular file can be stored under an installation directory of the main app. If it is determined (for example, by scanning) that the installation directory of the to-be-started sub-app exists in the storage space, then storage path information of the sub-app in the installation directory of the main app can be read to access an installation file under the installation directory of the sub-app, such that the sub-app in the main app can be started by means of resource reuse.

Figure 4:
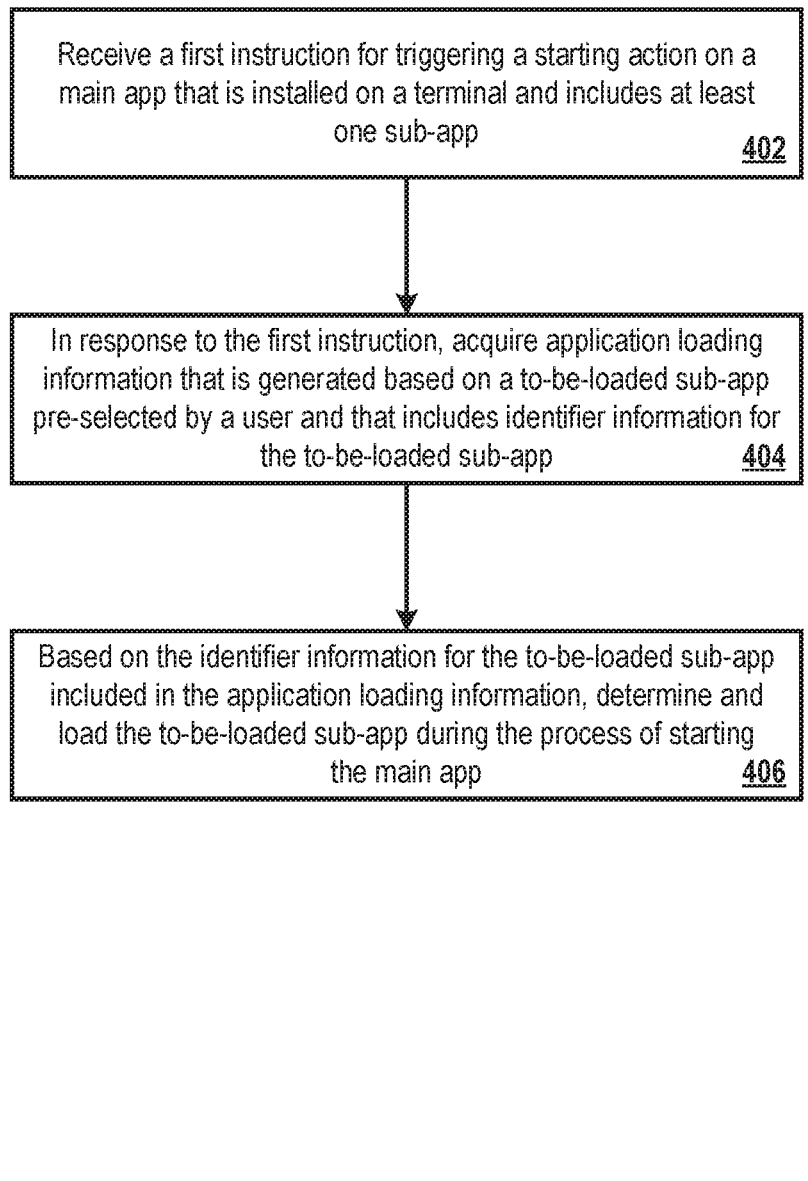
FIG. 4 is a flow chart of an example of a method for loading a terminal app, according to an implementation of the present disclosure.

FIG. 4 is a flow chart of an example of a method 400 for loading a terminal app, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a first instruction is received for triggering a starting action on a main app that is installed on a terminal and includes at least one sub-app. For example, the user can touch a designated area of a touch screen of a terminal with a finger. The designated area can be the location of the icon 110 of the main app. The terminal can receive a first instruction of the user for triggering a starting action on the main app by sensing the user's action of tapping the icon 110 of the main app. From 402, method 400 proceeds to 404.

At 404, in response to the first instruction, application loading information is acquired that corresponds to the main app and includes identifier information about a to-be-loaded sub-app. In some implementations, step 404 can be different from step 204 in that the application loading information can be generated based on a to-be-loaded sub-app selected by a user. For example, the user can use a loading setting function of the main app to select several sub-apps needing to be loaded to serve as objects needing to be loaded during the process of starting the main app. For example, the user can select a first sub-app and a second sub-app that are used relatively frequently on a daily basis as to-be-loaded sub-apps. From 404, method 400 proceeds to 406.

At 406, the to-be-loaded sub-app is determined and loaded during the process of starting the main app based on the identifier information about the to-be-loaded sub-app included in the acquired application loading information. For example, based on the acquired file pre-written into the application loading information, the terminal can obtain to-be-loaded sub-apps by analysis and load the determined sub-apps during the process of starting the main app. For example, if the determined to-be-loaded sub-apps are the second app and the fourth app, only these two apps need to be loaded during the process of starting the main app. This can eliminate the disadvantage in conventional systems in which the loading time is long and the speed of opening the main app is slow, since all sub-apps included in a certain main app need to be loaded at a time during the process of starting the main app. After 406, method 400 stops.

Figure 5:
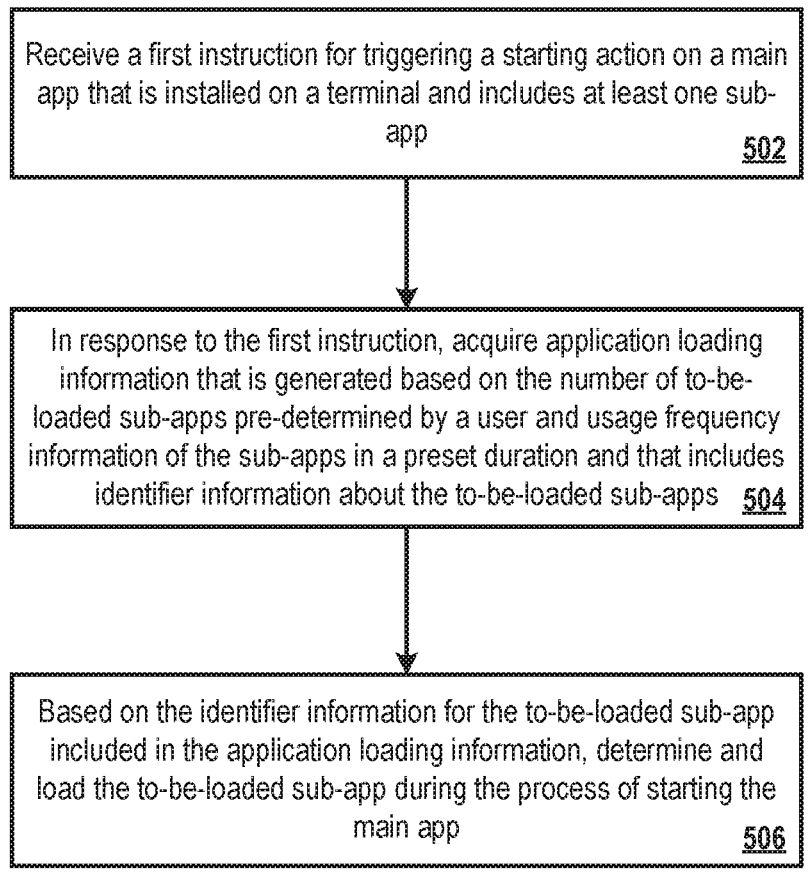
FIG. 5 is a flow chart of an example of a method for loading a terminal app, according to an implementation of the present disclosure.

FIG. 5 is a flow chart of an example of a method 500 for loading a terminal app, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a first instruction is received for triggering a starting action on a main app that is installed on a terminal and includes at least one sub-app. For example, a user can touch a designated area of a touch screen of a terminal with a finger. The designated area can be the location of the icon 110 of the main app. The terminal can receive a first instruction of the user for triggering a starting action on the main app by sensing the user's action of tapping the icon 110 of the main app.

At 504, in response to the first instruction, application loading information is acquired that is generated based on the number of to-be-loaded sub-apps pre-determined by a user and usage frequency information of the sub-apps in a predefined time period and that includes identifier information about the to-be-loaded sub-apps. For example, the user can determine the number of to-be-loaded sub-apps (for example, three) by using a setting function of the main app, and then the terminal can periodical acquire usage frequency information of the sub-apps. If the sub-apps are sorted according to the usage frequency information, for example, the sub-apps can be ranked as: the second sub-app>the fourth sub-app>the first sub-app>the fifth sub-app>the third sub-app>the sixth sub-app. Three to-be-loaded sub-apps finally obtained can include the second sub-app, the fourth sub-app, and the first sub-app, respectively, and then the application loading information can be generated and stored in a storage space of the terminal.

At 506, the to-be-loaded sub-app is determined and loaded during the process of starting the main app and based on the identifier information about the to-be-loaded sub-app included in the acquired application loading information. For example, based on the acquired file pre-written into the application loading information, the terminal can obtain to-be-loaded sub-apps by analysis and load the determined sub-apps during the process of starting the main app. For example, if the determined to-be-loaded sub-apps are the second app and the fourth app, only these two apps need to be loaded during the process of starting the main app. This can eliminate the disadvantage in conventional systems in which the loading time is long and the speed of opening the main app is slow, since all sub-apps included in a certain main app need to be loaded at a time during the process of starting the main app. After 506, method 500 stops.

It some implementations, after a first instruction for triggering a starting action on a main app is received, application loading information that corresponds to the main app can be acquired. Then, a to-be-loaded sub-app can be determined by analyzing the application loading information, and the determined to-be-loaded sub-app can be loaded during the process of starting the main app. The to-be-loaded sub-app can be determined based on the acquired application loading information compared with the loading of all sub-apps included in a main app in conventional systems. In addition, the terminal can access resources (files) in an installation directory of a sub-app in the main app. This is different from conventional systems in which, when a user opens a certain sub-app in a main app, it is common to directly run a to-be-started sub-app (an app installed independently). Therefore, techniques used in the present application can reduce consumption of resources of the terminal as compared with the conventional systems.

Figure 6:
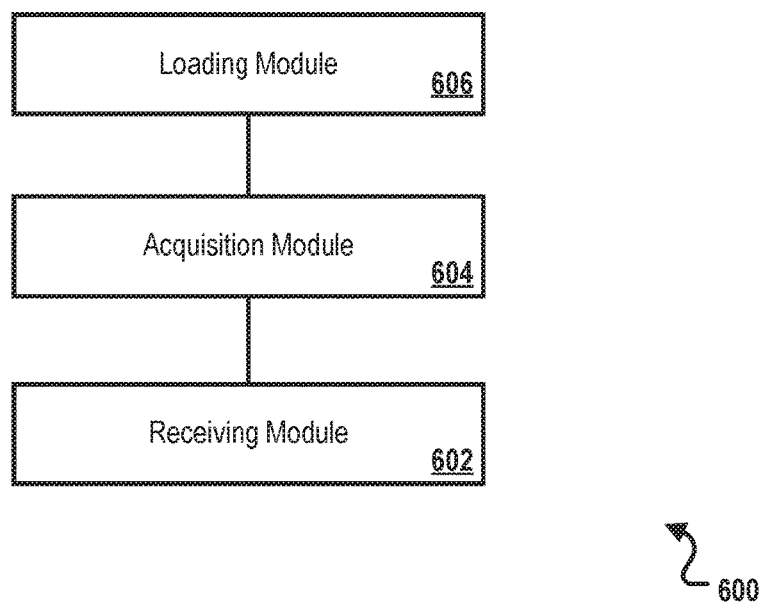
FIG. 6 is a block diagram of an example of a system for loading a terminal app, according to an implementation of the present disclosure.

FIG. 6 is a block diagram of an example of a system 600 for loading a terminal app, according to an implementation of the present disclosure. A receiving module 602 can be configured to receive an instruction for triggering a starting action on a main app that is installed on a terminal and includes at least one sub-app. An acquisition module 604 can be configured to, in response to the instruction, acquire application loading information that corresponds to the main app and includes identifier information about a to-be-loaded sub-app. A loading module 606 can be configured to determine and load the to-be-loaded sub-app during the process of starting the main app, based on the identifier information about the to-be-loaded sub-app included in the acquired application loading information.

In some implementations, the acquisition module 604 can be further configured to 1) acquire application loading information that is generated based on usage frequency information of the sub-app in a predefined time period and includes identifier information about a to-be-loaded sub-app; 2) acquire application loading information that is generated based on a to-be-loaded sub-app pre-selected by a user and includes identifier information about the to-be-loaded sub-app; or 3) acquire application loading information that is generated based on the number of to-be-loaded sub-apps pre-determined by a user and usage frequency information of the sub-apps in a predefined time period and includes identifier information about the to-be-loaded sub-apps.

Figure 7:
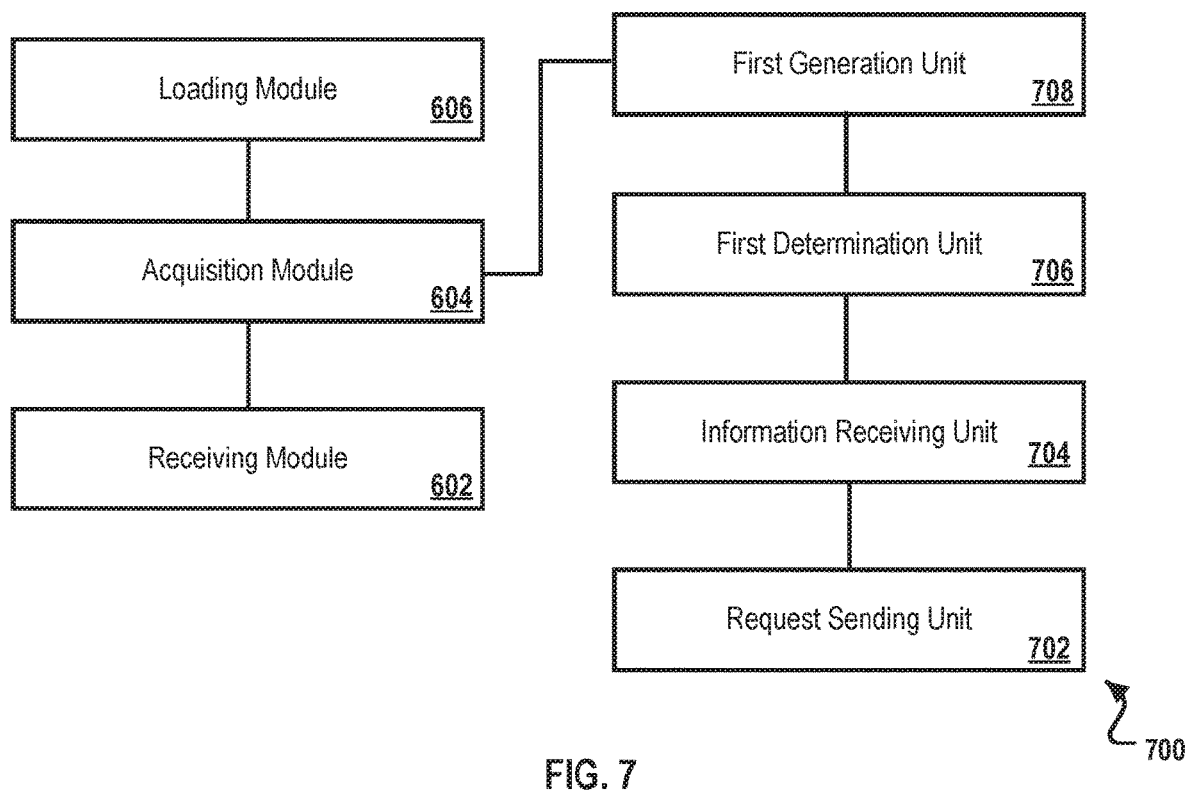
FIG. 7 is a block diagram of an example of a system for loading a terminal app, according to an implementation of the present disclosure.

FIG. 7 is a block diagram of an example of a system 700 for loading a terminal app, according to an implementation of the present disclosure. A request sending unit 702 can be configured to send request information for acquiring usage frequency information to a server side.

An information receiving unit 704 can be configured to, in response to the request information, receive usage frequency information of sub-apps sent by the server side and included in the main app in a predefined time period. A first determination unit 706 can be configured to sort the received usage frequency information in a descending order, and determine a sub-app whose usage frequency information is sorted at the forefront as the to-be-loaded sub-app.

In some implementations, the first determination unit 706 can be configured to generate application loading information that includes identifier information about the to-be-loaded sub-app and store the application loading information in a designated directory of the terminal. In some implementations, the acquisition module 604 can be further configured to read from the designated directory of the terminal the application loading information that corresponds to the main app and includes the identifier information about the to-be-loaded sub-app.

Figure 8:
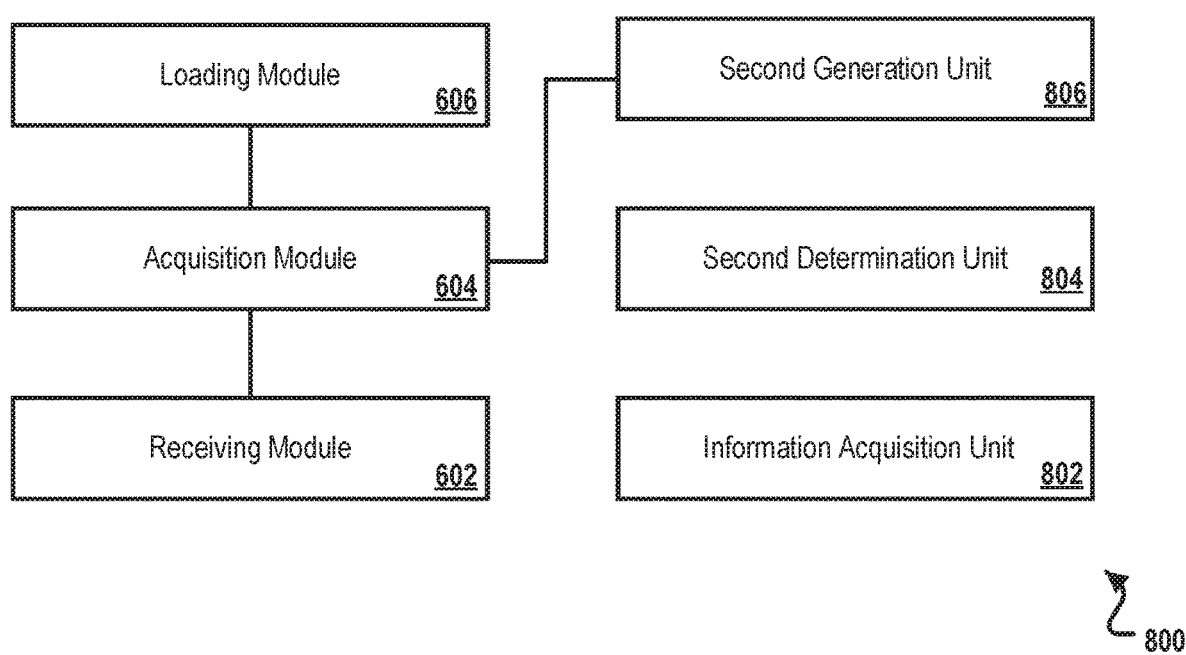
FIG. 8 is a block diagram of an example of a system for loading a terminal app, according to an implementation of the present disclosure

FIG. 8 is a block diagram of an example of a system 800 for loading a terminal app, according to an implementation of the present disclosure. An information acquisition unit 802 can be configured to acquire usage frequency information of sub-apps included in the main app in a predefined time period from an installation directory of the main app of the terminal. A second determination unit 804 can be configured to sort the received usage frequency information in a descending order, and determine a sub-app whose usage frequency information is sorted at the forefront as the to-be-loaded sub-app.

A second generation unit 806 can be configured to generate application loading information that includes identifier information about the to-be-loaded sub-app and store the application loading information in a designated directory of the terminal. In some implementations, the acquisition module 604 can be further configured to read from the designated directory of the terminal the application loading information that corresponds to the main app and includes the identifier information about the to-be-loaded sub-app.

Figure 9:
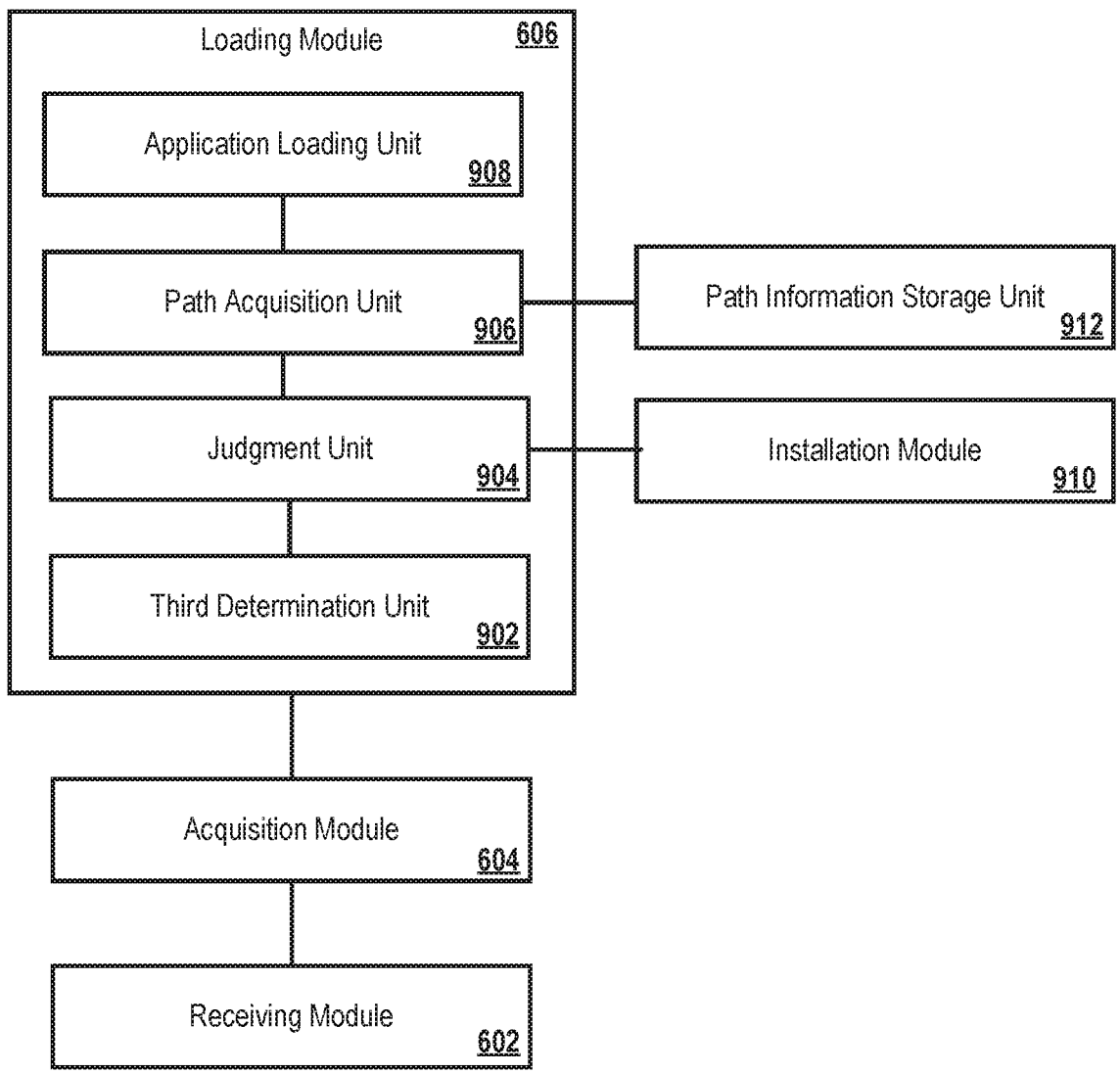
FIG. 9 is a block diagram of an example of the loading module for loading a terminal app, according to an implementation of the present disclosure.

FIG. 9 is a block diagram of an example of the loading module 606 for loading a terminal app, according to an implementation of the present disclosure. A third determination unit 902 can be configured to determine the to-be-loaded sub-app during the process of starting the main app, based on the identifier information about the to-be-loaded sub-app included in the acquired application loading information. A judgment unit 904 can be configured to judge whether the terminal has an installation directory of the to-be-loaded sub-app;

A path acquisition unit 906 can be configured to acquire storage path information that corresponds to the installation directory of the to-be-loaded sub-app when the terminal has an installation directory of the to-be-loaded sub-app. An application loading unit 908 can be configured to, based on the acquired storage path information, access a file in the installation directory of the to-be-loaded sub-app in the main app and load the to-be-loaded sub-app.

In some implementations, the loading module 606 can further include the following. An installation module 910 can be configured to acquire an installation package that corresponds to the to-be-loaded sub-app and install the package on the terminal if the terminal does not have an installation directory of the to-be-loaded sub-app. A path information storage unit 912 can be configured to store storage path information that corresponds to the installation directory of the to-be-loaded sub-app into an installation directory of the main app.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   acquiring usage frequency information of a plurality of sub-applications (sub-apps) included in a main application (app) installed on a terminal, the usage frequency information pertaining to a predefined time period;
   sorting the acquired usage frequency information in descending order;
   determining, based on the sorting, a first sub-app whose usage frequency is sorted at a forefront of the plurality of sub-apps;
   generating and storing application loading information corresponding to the main app in a designated directory of the terminal, the application loading information including identifier information for the first sub-app;
   receiving a first instruction for triggering a starting action on the main app;
   in response to the first instruction, acquiring the application loading information corresponding to the main app by reading the application loading information from the designated directory of the terminal;
   based on the identifier information for the first sub-app, determining and loading the first sub-app during a process of starting the main app;
   storing, on the terminal, storage path information corresponding to an installation directory of the first sub-app into an installation directory of the main app;
   receiving a second instruction for triggering a starting action on a particular sub-app associated with the main app;
   in response to the second instruction, determining the particular sub-app is different from the first sub-app loaded during the process of starting the main app;
   determining that the terminal does not have an installation directory associated with the particular sub-app;
   responsive to determining that the terminal does not have the installation directory associated with the particular sub-app, acquiring an installation package corresponding to the particular sub-app, and installing the installation package corresponding to the particular sub-app on the terminal;
   acquiring storage path information corresponding to the installation directory associated with the particular sub-app; and
   based on the acquired storage path information, accessing a file in the installation directory associated with the particular sub-app in the main app and loading the particular sub-app.

2. The computer-implemented method of claim 1, wherein acquiring the usage frequency information of the plurality of sub-apps comprises:
   sending, to a server, request information for acquiring the usage frequency information; and
   in response to sending the request information, receiving the usage frequency information of the plurality of sub-apps sent by the server.

3. A non-transitory, computer-readable medium storing one or more instructions executed by a computer system to perform operations comprising:
   acquiring usage frequency information of a plurality of sub-applications (sub-apps) included in a main application (app) installed on a terminal, the usage frequency information pertaining to a predefined time period;
   sorting the acquired usage frequency information in descending order;
   determining, based on the sorting, a first sub-app whose usage frequency is sorted at a forefront of the plurality of sub-apps;
   generating and storing application loading information corresponding to the main app in a designated directory of the terminal, the application loading information including identifier information for the first sub-app;
   receiving a first instruction for triggering a starting action on the main app;
   in response to the first instruction, acquiring the application loading information corresponding to the main app by reading the application loading information from the designated directory of the terminal;
   based on the identifier information for the first sub-app, determining and loading the first sub-app during a process of starting the main app;
   storing, on the terminal, storage path information corresponding to an installation directory of the first sub-app into an installation directory of the main app;
   receiving a second instruction for triggering a starting action on a particular sub-app associated with the main app;
   in response to the second instruction, determining the particular sub-app is different from the first sub-app loaded during the process of starting the main app;
   determining that the terminal does not have an installation directory associated with the particular sub-app;
   responsive to determining that the terminal does not have the installation directory associated with the particular sub-app, acquiring an installation package corresponding to the particular sub-app, and installing the installation package corresponding to the particular sub-app on the terminal;
acquiring storage path information corresponding to the installation directory associated with the particular sub-app; and
based on the acquired storage path information, accessing a file in the installation directory associated with the particular sub-app in the main app and loading the particular sub-app.

4. The non-transitory, computer-readable medium of claim 3, wherein acquiring the usage frequency information of the plurality of sub-apps comprises:
sending, to a server, request information for acquiring the usage frequency information; and
in response to sending the request information, receiving the usage frequency information of the plurality of sub-apps sent by the server.

5. A computer-implemented system, comprising:
one or more computers; and
one or more computer memory devices interoperably coupled with the one or more computers and having tangible, non-transitory, machine-readable media storing one or more instructions executed by the one or more computers that perform one or more operations comprising:
acquiring usage frequency information of a plurality of sub-applications (sub-apps) included in a main application (app) installed on a terminal, the usage frequency information pertaining to a predefined time period;
sorting the acquired usage frequency information in descending order;
determining, based on the sorting, a first sub-app whose usage frequency is sorted at a forefront of the plurality of sub-apps;
generating and storing application loading information corresponding to the main app in a designated directory of the terminal, the application loading information including identifier information for the first sub-app;
receiving a first instruction for triggering a starting action on the main app;
in response to the first instruction, acquiring the application loading information corresponding to the main app by reading the application loading information from the designated directory of the terminal;
based on the identifier information for the first sub-app, determining and loading the first sub-app during a process of starting the main app;
storing, on the terminal, storage path information corresponding to an installation directory of the first sub-app into an installation directory of the main app;
receiving a second instruction for triggering a starting action on a particular sub-app associated with the main app;
in response to the second instruction, determining the particular sub-app is different from the first sub-app loaded during the process of starting the main app;
determining that the terminal does not have an installation directory associated with the particular sub-app;
responsive to determining that the terminal does not have the installation directory associated with the particular sub-app, acquiring an installation package corresponding to the particular sub-app, and installing the installation package corresponding to the particular sub-app on the terminal;
acquiring storage path information corresponding to the installation directory associated with the particular sub-app; and
based on the acquired storage path information, accessing a file in the installation directory associated with the particular sub-app in the main app and loading the particular sub-app.

6. The computer-implemented system of claim 5, wherein acquiring the usage frequency information of the plurality of sub-apps comprises:
sending, to a server, request information for acquiring the usage frequency information; and
in response to sending the request information, receiving the usage frequency information of the plurality of sub-apps sent by the server.

* * * * *